United States Patent [19]

Leduc et al.

[11] Patent Number: 5,199,067
[45] Date of Patent: Mar. 30, 1993

[54] PROCESS FOR PROMOTION OF PAY TELEVISION BROADCASTS, AND DEVICE FOR USE OF THE PROCESS

[75] Inventors: Michel Leduc, Boersch; Joël Hamon, Lipsheim; Eric Diehl, Neudorf; Albert Dorner, Strasbourg; Jacky Mahler, Niederbronn Les Bains, all of France

[73] Assignee: Laboratoire Europeen De Recherches Electroniques Avancees Societe En Nom Collectif, Courbevoie, France

[21] Appl. No.: 625,069

[22] Filed: Dec. 10, 1990

[30] Foreign Application Priority Data

Dec. 8, 1989 [FR] France ................ 89 16271

[51] Int. Cl.$^5$ .............................................. H04N 7/167
[52] U.S. Cl. ........................................ 380/10; 380/17; 358/143
[58] Field of Search ................ 380/10, 14, 17, 16; 358/143

[56] References Cited

U.S. PATENT DOCUMENTS

| 4,635,113 | 1/1987 | Okada et al. | 380/17 |
| 4,700,386 | 10/1987 | Kohn | 380/10 |
| 4,893,248 | 1/1990 | Pitts et al. | 380/10 |
| 4,991,011 | 2/1991 | Johnson et al. | 358/143 |
| 5,003,384 | 3/1991 | Durden et al. | 380/10 |

FOREIGN PATENT DOCUMENTS 3530822 4/1987 Fed. Rep. of Germany .

OTHER PUBLICATIONS

Funkschau, vol. 57, No. 8, Apr., 1985, pp. 58-61, G. Bock, "So Funktioniert Scrambling".
Electronics, vol. 42, No. 11, May 26, 1969, pp. 123-128, F. Corey, "Pay TV Gets in the Broadcast Pictures".

Primary Examiner—Thomas H. Tarcza
Assistant Examiner—David Cain
Attorney, Agent, or Firm—Oblon, Spivak, McClelland, Maier & Neustadt

[57] ABSTRACT

The process of the invention concerns pay television networks with reinforced scrambling. To attract potential subscribers, the invention consists in cyclically transmitting non-scrambled images for brief periods, so that the type of program can be seen.

17 Claims, 1 Drawing Sheet

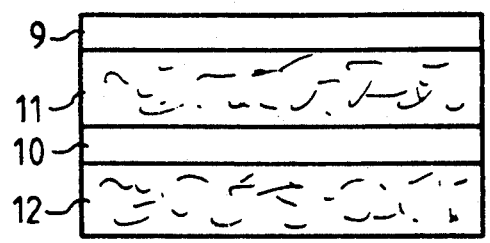
FIG_1
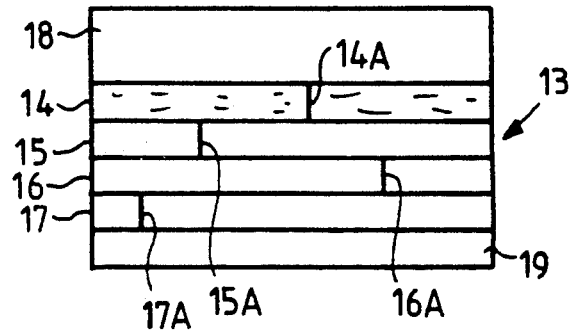
FIG_2
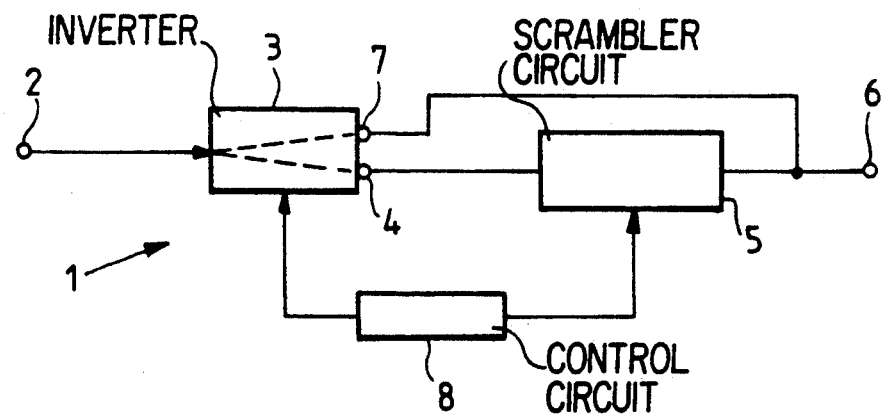
FIG_3
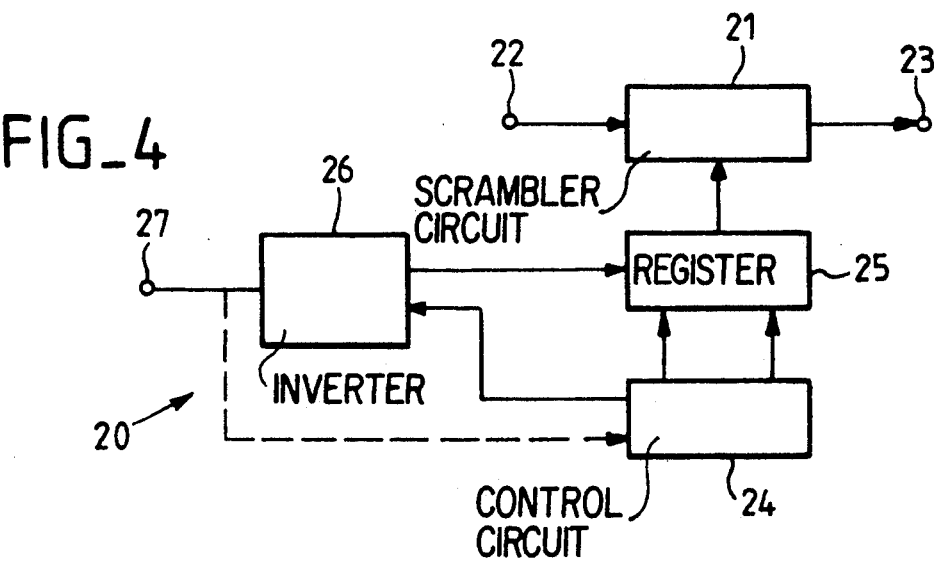
FIG_4

PROCESS FOR PROMOTION OF PAY TELEVISION BROADCASTS, AND DEVICE FOR USE OF THE PROCESS

BACKGROUND OF THE INVENTION

The present invention concerns a process for promotion of pay television broadcasts and a device for use of this process.

The television images broadcast by pay television network emitters are at present scrambled in a relatively non-confidential way using "first generation" systems (for example by phase shift), but such coding is relatively easy to circumvent. These systems are tending to be replaced by "second generation" systems (for example with digital images) which are more sophisticated and much more difficult or nearly impossible to "pirate", at least without using means whose cost is considerably higher than that of subscribing to the system, even over a long period. In this case, the broadcast is scrambled to such a degree that the type of images emitted and the nature of the scrambled programs cannot be recognized. An image thus completely scrambled cannot attract potential subscribers, and simply reading about the programs in a newspaper is hardly more attractive.

SUMMARY OF THE INVENTION

The object of the present invention is a process enabling potential subscribers to be attracted as effectively as possible to a pay television network, and a device for the use of this process.

The process according to the invention consists in reducing the level of program scrambling during part of the emission time in scrambled mode.

According to one aspect of the process, at least part of the image is made visible during part of the broadcast time. According to an advantageous aspect of this process, non-scrambled messages are displayed on the screens of receivers not equipped with decoders, at approximately regular intervals, indicating for example how to subscribe to this network.

The device according to the invention comprises, in the emitter, an inverter controlled by the scrambling control circuit, connected to the video channel before the scrambling circuit, one of the two outputs from this switch being connected to the input of the scrambling circuit and the other being connected directly to the output of the scrambling circuit.

According to a variant of the invention, the device is equipped with a register fitted between the pseudo-random generator of the device controlling scrambling and the video scrambling circuit, the control input of this register being connected to a line counting circuit.

BRIEF DESCRIPTION OF THE DRAWING

The present invention will be better understood on reading the detailed description of several modes of embodiment, taken as non-restrictive examples and illustrated by the appended drawing, in which:

FIGS. 1 and 2 are two examples of images scrambled in accordance with the process of the invention, and FIGS. 3 and 4 are simplified block diagrams of scrambling control circuits in accordance with the invention.

DESCRIPTION OF THE PREFERRED EMBODIMENT

According to a first aspect of the process of the invention, alternate periods of scrambled and non-scrambled transmission of the image of a pay television network are controlled. This alternation can be cyclic with a fixed or variable cyclic ratio. The alternation can also be random.

A circuit 1 for control of such an alternation has been represented in FIG. 3. The circuit 1 is placed in the video channel of a television emitter which can emit scrambled images. The terminal receiving the video to be scrambled is referenced 2. This terminal 2 is connected to the input of an inverter 3. A first output 4 of the inverter 3 is connected to the input of the video scrambling circuit 5 of the emitter. The output from the circuit 5 is connected to a terminal 6. The second output 7 of the inverter 3 is connected directly to the terminal 6. The circuit 5 is controlled by an appropriate control circuit 8, including for example, usually a microprocessor and a pseudo-random generator (not shown in detail).

The circuit 8 is programmed, in a manner well known to those in the profession, to control the successive switches of the inverter 3 in a regular or random manner. The periods during which the inverter 3 activates its output 7 are preferably shorter (for example in a ratio of between 1:3 and 1:10) than the periods during which the inverter 3 activates its output 4. Thus it is possible to attract a non-subscribing televiewer by showing parts of the programs broadcast, although the viewer will not be able to follow the programs for long owing to the nuisance caused by the alternation of scrambled and non-scrambled images.

According to a second aspect of the process of the invention, illustrated in FIG. 1, only part of the image is scrambled. As represented in simplified form in FIG. 1, it is possible to alternate non-scrambled zones 9, 10 with completely scrambled zones 11, 12. In a simple manner, these zones are horizontal bands covering the whole width of the screen. According to variants, not represented, these zones can be vertical bands covering the whole height of the screen, or temporal "windows" in the screen image. All these zones can be fixed or mobile.

According to a third aspect of the process of the invention, illustrated in FIG. 2, a "mosaic" 13 is created in at least part of the image. This mosaic 13 includes a succession of horizontal bands 14, 15, 16, 17, etc., covering the whole width of the image. In each of these bands a cut-off point 14A, 15A, 16A, 17A is determined, which is the same for all the lines in the band concerned. These cut-off points can be fixed for the whole duration of an emission, or remain fixed for short periods (a few seconds, for example), then change position, independently or together, by small steps in the same direction or at random. The widths of these horizontal bands can be the same or different, and can be fixed or variable. The height of the mosaic 13 can be equal to or less than that of the image, and in the latter case the non-scrambled zones can be on each side of the mosaic (zones 18 and 19 at the top and bottom respectively of the screen as shown in FIG. 2), or on one side only, or alternate with several zones of mosaic.

In FIG. 4 has been represented the simplified block diagram of a circuit 20 enabling the second and third aspects mentioned above of the process of the invention to be implemented.

The circuit 20 has a conventional video scrambling circuit 21 whose input 22 receives the video signal to be scrambled, and at whose output 23 the scrambled video appears. The circuit 21 is controlled by an appropriate control circuit 24 with a microprocessor and a pseudo-random generator, similar to the circuit 8 in FIG. 3.

A register 25, for example of three-state type, is inserted between circuits 21 and 24. The input activating high impedance of the register 25 is connected to a counter 26 which receives at its input 27 signals derived from the line synchronization signals. The counter 26 can be pre-programmed or controlled by the circuit 24. Thus, the counter 26 can block the connection between the control circuit 24 and the scrambling circuit 21 during a certain number of lines, and thus provoke non-scrambled transmission of the band comprising these lines, the others being emitted in normal scrambled fashion.

To form the configuration in FIG. 2, the counter 26 blocks transmission between the circuit 24 and the circuit 21, by inhibiting the register 25, during the "non-scrambled" periods 18 and 19, and the formation of the mosaic 13 is controlled by the circuit 24, which also receives the signals from the terminal 27 and which is programmed in such a way as to produce the same cut-off point for a certain number of lines.

To produce vertical bands or windows in the image, the circuit 24 is programmed to inhibit the register 25 at given places in each line.

We claim:

1. A process for promotion of pay television network broadcast, comprising the steps of:
   providing a television broadcast signal;
   scrambling said television signal to a predetermined level in order to emit a scrambled signal; and
   controlling, independent of said viewer, said scrambling in order to provide a preprogrammed intermittent reduction in the percentage of said broadcast signal rendered unintelligible.

2. Process according to claim 1, wherein at least part of an image is made visible during said intermittent reduction.

3. Process according to claim 1, wherein non-scrambled messages are displayed at at least approximately regular intervals on reception screens not equipped with decoders.

4. Process according to claim 3, wherein the messages indicate how to subscribe to the network.

5. Process according to claim 1, wherein there are alternate periods of scrambled and non-scrambled image emission.

6. Process according to claim 5, wherein the alternate periods have a fixed cyclic ratio.

7. Process according to claim 5, wherein the alternate periods have a variable cyclic ratio.

8. Process according to claim 5, wherein the alternate periods are random.

9. Process according to claim 1, wherein non-scrambled zones and completely scrambled zones are made to alternate in the signal emitted.

10. Process according to claim 9, wherein these zones are horizontal bands covering the whole width of a television screen.

11. Process according to claim 9, wherein these zones are vertical bands covering the whole height of a television screen.

12. Process according to claim 9, wherein the non-scrambled zones are temporal windows in a television screen image.

13. Process according to claim 9, wherein the zones are fixed.

14. Process according to claim 9, wherein the zones are mobile.

15. Process according to claim 1, wherein a mosaic is created over at least part of a television screen, containing a succession of horizontal bands in each of which a cut-off point is determined which is the same for all the lines in the band concerned.

16. A pay television broadcast promotion device in a pay television system, comprising a television transmitter and a plurality of receivers, wherein said transmitter comprises an inverter controlled by a scrambling control circuit, said invertor being connected to a video channel of the transmitter before a scrambling circuit, a first output of said inverter being connected to an input of the scrambling circuit, and its second output being directly connected to an output of the scrambling circuit.

17. The pay television promotion device according to claim 16, further including a register inserted between a pseudo-random generator circuit controlling the scrambling and said video scrambling circuit, the control input of said register being connected to a line counting circuit.

* * * * *